United States Patent

Allen et al.

[15] 3,640,539

[45] Feb. 8, 1972

[54] LINEAR PHONOGRAPH RECORD STRIP

[72] Inventors: Clayton H. Allen, Wellesley; John C. Heine, Cambridge, both of Mass.

[73] Assignee: Bolt Beranek and Newman Inc., Cambridge, Mass.

[22] Filed: Sept. 3, 1969

[21] Appl. No.: 854,935

Related U.S. Application Data

[62] Division of Ser. No. 613,873, Feb. 3, 1967, Pat. No. 3,480,281.

[52] U.S. Cl. ....................274/42
[51] Int. Cl. ....................G11b 3/72, G11b 3/78
[58] Field of Search ....................274/1.1, 42, 11, 41.4

[56] References Cited

UNITED STATES PATENTS

| | | | |
|---|---|---|---|
| 1,792,159 | 2/1931 | Gonzalez | 274/42 |
| 1,904,944 | 4/1933 | Herklots | 274/43 |
| 3,082,006 | 3/1963 | Ryan | 274/1 A |
| 3,285,609 | 11/1966 | Hiller | 274/42 X |
| 3,450,239 | 6/1969 | Ryan et al. | 274/1 A |

*Primary Examiner*—Harry N. Haroian
*Attorney*—Rines and Rines

[57] ABSTRACT

Linear phonograph record strip with plural messages in parallel longitudinally extending record grooves, the grooves having starting points lying along a common line and successively spaced longitudinally of the record strip.

1 Claims, 5 Drawing Figures

CLAYTON H. ALLEN
JOHN C. HEINE INVENTORS

BY Rines and Rines
ATTORNEYS

CLAYTON H. ALLEN
JOHN C. HEINE INVENTORS

BY Rines and Rines
ATTORNEYS

LINEAR PHONOGRAPH RECORD STRIP

REFERENCE TO COPENDING APPLICATION

This application is a division of Ser. No. 613,873, filed Feb. 3, 1967 for "Method of Phonograph Record Fabrication and Novel Linear Record Strip" now U.S. Pat. No. 3,480,281.

BACKGROUND OF THE INVENTION

This invention relates to a substantially linear record strip or tape and is more particularly concerned with a linear record strip or tape having plural messages in parallel grooves.

In important applications of relatively inexpensive phonograph records and the like, it is frequently desirable to obtain a substantially linear tape or strip having substantially parallel recorded grooves or tracks which may, for example, contain different recorded messages, as for use in a "talking" toy or the like. While the techniques for recording upon disc-type records are quite conventional and simple, it is more complex to try to produce linear grooves or tracks upon tapes and the like.

BRIEF DESCRIPTION OF THE INVENTION

It is accordingly a principal object of the invention to provide a novel substantially linear record strip, which maybe readily manufactured, for example, by converting spiral phonograph recording grooves upon an annular record into a substantially linear record strip.

A further object of the invention is to provide a novel linear record strip with plural messages arranged in parallel grooves, the successive starting points of which lie along a line.

In summary, the linear record strip of the invention may comprise parallel record grooves containing different messages, the grooves extending longitudinally of the strip and having successive starting points lying along a common line and spaced longitudinally of the record strip.

BRIEF DESCRIPTION OF THE DRAWINGS

The invention will now be described with reference to the accompanying drawings, FIG. 1 of which is a plan view of a disc or annular-type record which it is desired to convert into a substantially linear record strip.

DETAILED DESCRIPTION OF THE INVENTION

Figure 1:
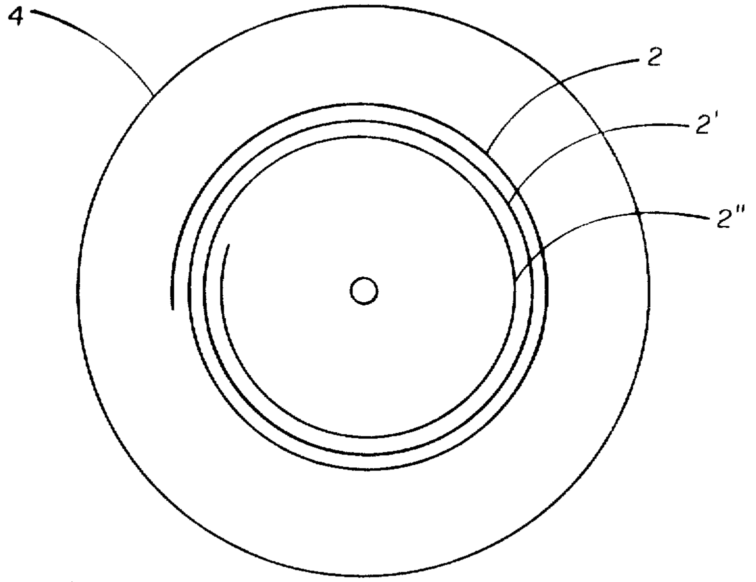

A linear record strip in accordance with the invention may be manufactured as described and claimed in the said copending application Ser. No. 613,873. More specifically, the strip may be made by flowing an impressionable resilient plastic material upon an annular record containing spiral phonograph grooves to form negative impressions thereof which thereupon set into substantially permanent shape. The material is the constrainingly straightened with a linear channel to hold the same while maintaining the negative groove impressions as substantially parallel linear grooves having negligible distortion from the recorded spiral groove information. A record stamping is the formed from the straightened material.

Referring to the drawing, a recording disc 4, containing an annular region of preferably substantially uniformly spaced spiral phonograph recording grooves 2, 2', 2'', etc., (hereinafter sometimes referred to as an annular record) is to be converted, in accordance with the invention, into a substantially linear record strip for more convenient use in, for example, a toy phonograph reproducing system, wherein the phonograph needle is to play upon substantially parallel linearly disposed recording grooves. The annular record 4 is placed at the bottom of a mold comprising an inner disc 8 and an outer ring 8' defining between then an annular cavity 8'' that is aligned with the recording groove area, FIG. 2.

Figures 2, 3:
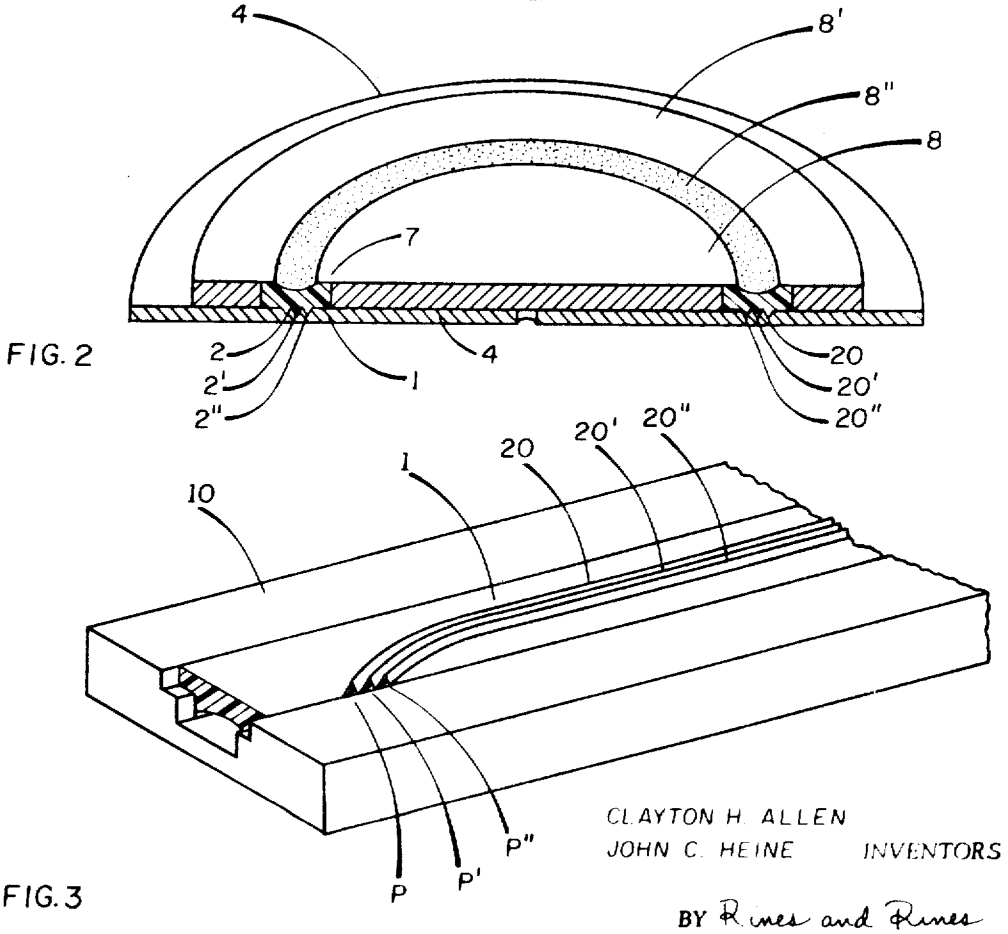
FIGS. 2, 3 and 4 are sectional fragmentized isometric views illustrating preferred method steps in effecting such conversion, FIGS. 3 and 4 also illustrating the appearance of the linear record strip.
Figure 4:
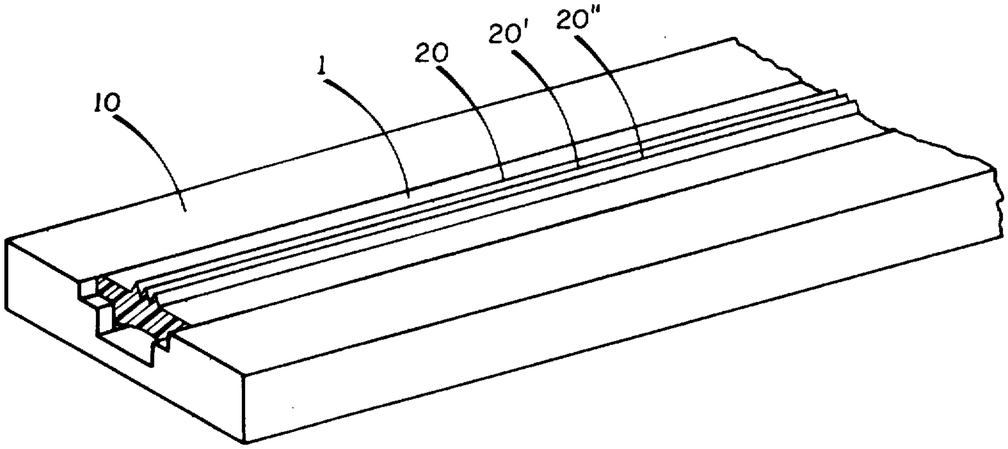

An impressionable resilient plastic material 1, such as silicone rubber and the like, is flowed into the cavity 8'' upon the annular record 4 to fill the spiral grooves 2, 2', 2'', etc., and thus form negative impressions thereof as indicated at 20, 29', 20'', etc. Such plastic materials thereupon rather readily set following the flowing (or may be heated or otherwise cured to aid in setting, as required, in well known manner), to render the negative impressions 20, 20', 20'', etc., substantially permanent. The set plastic ring 1, preferably of substantially T-shaped cross section, formed by the upper lips 7 in the mold elements 8 and 8' of FIG. 2, is now removed from the mold, as by first removing the inner disc 8; and it may then be transversely slit, preferably in the region of the commencements of recorded messages on each of the record grooves. It is apparent, of course, that the separate recorded messages in the successive tracks need not extend beyond the slit line, os that the slitting of the ring does not interrupt the messages. The slit plastic ring 1 is then constrainingly straightened within a linear channel 10, FIG. 4, (also of T-shaped cross section) into a substantially straight or linear strip, with the negative record groove impressions being maintained as substantially parallel longitudinal linear grooves or tracks 20, 20', 20'', etc.

Through the use of silicone rubbers and the like, such as those sold under the trademark "Silastic" by Dow-Corning, the process of filling the mold cavity in FIG. 2 and the effecting the self-setting to a degree sufficient to render the negative groove impressions substantially permanent has been found to occur within a few hours. As before stated, of course, the setting may be expedited by heat or other type of curing. When thus adequately set, however, it has been found that the constrained straightening of the type shown in FIG. 4 and above described will introduce negligible distortion into the negative linear record grooves 20, 20', 20'', as compared with the groove information initially recorded in the spiral grooves 2, 2', 2''. Further to this end, the substantially T-shaped cross section of the mold has provided sufficient thickness in the negative impression region to ensure the stability above-discussed irrespective of the degree of filling of the upper portion of the mold cavity 8''. Thus extreme care in the absolute filling of the mold cavity is not imperative in the manufacturing process.

Figure 5:
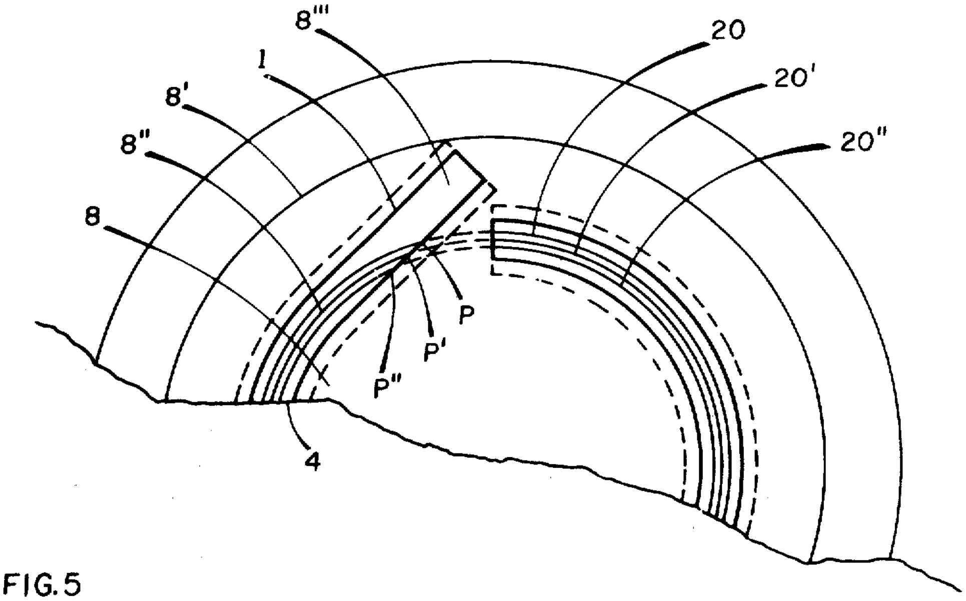
FIG. 5 is a fragmentary plan view of a modified mold for producing the strip.

It is also desirable, however, to have the commencements of the separate recorded messages contained in successive spiral grooves start at successively disposed points P, P', P'', etc., along a common fixed or bottom line or groove of the linear record strip 1, FIGS. 3 and 5, as for the convenience of bringing the reproducing needle always to the same line, though to different successively displaced points therealong for commencing the playback of the different recorded messages on the successive recording grooves. This may be achieved by modifying the mold cavity in the region of the commencement of the recorded messages, as shown at 8''' in FIG. 5, to cause the plastic to flow transversely across, and thus to intersect the annular record grooves. In this manner, the successive starting points P, P', P'', etc., of the successive record grooves on the linear strip 1 of FIG. 3 all lie along a common line, which, as shown in FIG. 3, for example, may be along a longitudinal edge of the strip, the grooves have curved portions connecting the starting points to the major portions of the grooves, which are substantially parallel to the longitudinal edges. The linear strip 1 may now be used to create the tape or strip record stamping by conventional and well-known plating steps, and then forming the plastic stamping master from the plated form. One such conventional process involves chemical deposition of silver upon the plastic strip 1 of FIG. 3 or FIG. 4, with the electrical current applied through the conductive-retaining channel 10, followed by nickel deposition thereupon by conventional electroplating processes. The resulting metal plate is stripped from the plastic form 1 and constitutes a positive master. This master is then plated to form a metal negative, which is separated from it, providing a negative stamping master, all as is well known in the art and unnecessary to detail in the present specification because it does not form a part of the novelty of the present invention.

The resulting linear strip record formed with the system of FIG. 5 will thus have the substantially parallel record grooves corresponding to 20, 20', and 20'', with the successive starting points P, P', P'', of the grooves lying at successive points along a common line, shown as the bottom line in FIG. 3.

Further modification will occur to those skilled in the art and all such are considered to fall within the spirit and scope of the invention.

What is claimed is:

1. A linear phonograph record strip having a plurality of longitudinally extending record grooves which are parallel from end-to-end, the major portions of said grooves being substantially parallel to the longitudinal edges of said strip, and the remaining portions of said grooves being smoothly curved and extending from said major portions to one of the longitudinal edges of said strip, the starting points of said grooves thereby being successively spaced along said one longitudinal edge, and each groove containing a separate recorded message which commences substantially at its said starting point and continues through the curved portion and the said major portion of the groove, whereby messages are provided in the curved and major portions with low distortion.

* * * * *